US011785064B2

(12) United States Patent
Newshutz et al.

(10) Patent No.: US 11,785,064 B2
(45) Date of Patent: Oct. 10, 2023

(54) INDIVIDUAL USER CONTENT CONTROL IN MULTIUSER CONTENT DELIVERY SYSTEMS

(71) Applicant: INTERNATIONAL BUSINESS MACHINES CORPORATION, Armonk, NY (US)

(72) Inventors: William Newshutz, Rochester, MN (US); Jared D. Hudson, Corcoran, MN (US); Ishraq Khan, Renton, WA (US); Adrian Abundez-Arce, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/303,364

(22) Filed: May 27, 2021

(65) Prior Publication Data
US 2022/0385708 A1    Dec. 1, 2022

(51) Int. Cl.
*G06F 15/16*      (2006.01)
*H04L 65/403*     (2022.01)
*H04L 65/401*     (2022.01)

(52) U.S. Cl.
CPC ........ *H04L 65/4046* (2013.01); *H04L 65/401* (2022.05)

(58) Field of Classification Search
None
See application file for complete search history.

(56) References Cited

U.S. PATENT DOCUMENTS

| | | | |
|---|---|---|---|
| 6,104,705 A | 8/2000 | Ismail |
| 6,453,336 B1 | 9/2002 | Beyda |
| 8,098,273 B2 | 1/2012 | Khouri |
| 8,139,744 B2 | 3/2012 | Carlson |
| 8,401,248 B1 | 3/2013 | Moon |
| 8,594,293 B2 | 11/2013 | Jeong |
| 8,934,382 B2 | 1/2015 | Rodman |
| 9,007,427 B2 | 4/2015 | Hoover |
| 9,118,940 B2 | 8/2015 | Valentine |

(Continued)

FOREIGN PATENT DOCUMENTS

| | | | |
|---|---|---|---|
| KR | 20170060023 A | | 5/2017 |
| WO | WO-2021163206 A1 | * | 8/2021 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Phyllis A Book
(74) *Attorney, Agent, or Firm* — Nathan M. Rau

(57) ABSTRACT

A system and method for providing electronic content to a user in a multi user content delivery system. A set of preferences are received from a first user at a preference component. This set of preferences indicates a portion of electronic content the first user desires to receive. Electronic content is received from a plurality of users by a content aggregator. This content is then aggregated. The electronic content is then modified for the user based on the received set of preferences. The modified content is then distributed or sent to the user by the content distributor.

20 Claims, 7 Drawing Sheets

(56) References Cited

U.S. PATENT DOCUMENTS

| | | | |
|---|---|---|---|
| 9,437,215 B2 | 9/2016 | Conway | |
| 9,986,004 B1* | 5/2018 | Carruth | H04L 65/612 |
| 10,523,722 B1* | 12/2019 | Katz | H04L 65/403 |
| 2002/0013852 A1* | 1/2002 | Janik | H04L 67/01 709/218 |
| 2003/0217121 A1* | 11/2003 | Willis | G06F 16/9535 709/219 |
| 2004/0003097 A1* | 1/2004 | Willis | G06F 16/954 709/228 |
| 2006/0062366 A1 | 3/2006 | Tiruthani | |
| 2006/0272028 A1* | 11/2006 | Maes | H04L 65/401 726/28 |
| 2008/0109306 A1* | 5/2008 | Maigret | G06Q 30/0277 705/14.46 |
| 2011/0299606 A1* | 12/2011 | Chen | H04L 65/80 375/240.26 |
| 2013/0124623 A1 | 5/2013 | Munter | |
| 2013/0317828 A1* | 11/2013 | Greenzeiger | G06F 16/00 704/E21.001 |
| 2013/0339875 A1 | 12/2013 | Sahai | |
| 2014/0006951 A1* | 1/2014 | Hunter | H04N 21/4821 715/719 |
| 2014/0340469 A1 | 11/2014 | Swanson | |
| 2015/0007213 A1* | 1/2015 | Donoghue | H04N 21/2668 725/38 |
| 2015/0028685 A1 | 1/2015 | Shaburov | |
| 2016/0212484 A1* | 7/2016 | Kimble | H04N 21/4667 |
| 2016/0217321 A1 | 7/2016 | Gottlieb | |
| 2016/0364012 A1 | 12/2016 | Govezensky | |
| 2018/0018507 A1 | 1/2018 | Chetlur | |
| 2018/0070123 A1* | 3/2018 | Sharma | H04N 21/4622 |
| 2018/0295158 A1 | 10/2018 | Faulkner | |
| 2018/0335930 A1 | 11/2018 | Scapel | |
| 2019/0147367 A1 | 5/2019 | Bellamy | |
| 2020/0228359 A1* | 7/2020 | el Kaliouby | H04L 12/1827 |
| 2021/0383127 A1 | 12/2021 | Kikin-Gil | |

OTHER PUBLICATIONS

"Method for Dynamic and Aggregated User Representations in Virtual Worlds," Published Aug. 4, 2009, IPCOM000185981D, https://priorart.ip.com/IPCOM/000185981.

"Track Participant Attention in Cisco Webex Training," Jul. 12, 2018, https://help.webex.com/en-us/st7tr1/Track-Participant-Attention-in-Cisco-Webex-Training.

A. Amir, B. Taba, D. Berg, T. Melano, J. McKinstry, C. Di Nolfo, T. Nayak, A. Andreopoulos, G. Garreau, M. Mendoza, J. Kusnitz, M. Debole, S. Esser, T. Delbruck, M. Flickner, and D. Modha, "A Low Power, Fully Event-Based Gesture Recognition System," 2017 IEEE Conference on Computer Vision and Pattern Recognition (CVPR), Honolulu, HI, 2017. https://www.research.ibm.com/dvsgesture/.

Anonymous, "Dynamic Management of Multiple Inputs and Outputs in a Multi-Modal Conferencing Environment," IPCOM000225782D, Published Mar. 5, 2013, https://priorart.ip.com/IPCOM/000225782.

Discord—Your Place to Talk and Hang Out, printed May 25, 2021, https://discord.com/.

Jenna Amatulli, "Zoom Can Track Who's Not Paying Attention In Your Video Call. Here's How," Published Mar. 25, 2020, https://www.huffpost.com/entry/zoom-tracks-not-paying-attention-video-call_l_5e7b96b5c5b6b7d80959ea96.

List of IBM Patents or Patent Applications Treated as Related, signed May 2021.

U.S. Appl. No. 17/303,366 Notice of References, mailed Jul. 6, 2023, 1pg.

* cited by examiner

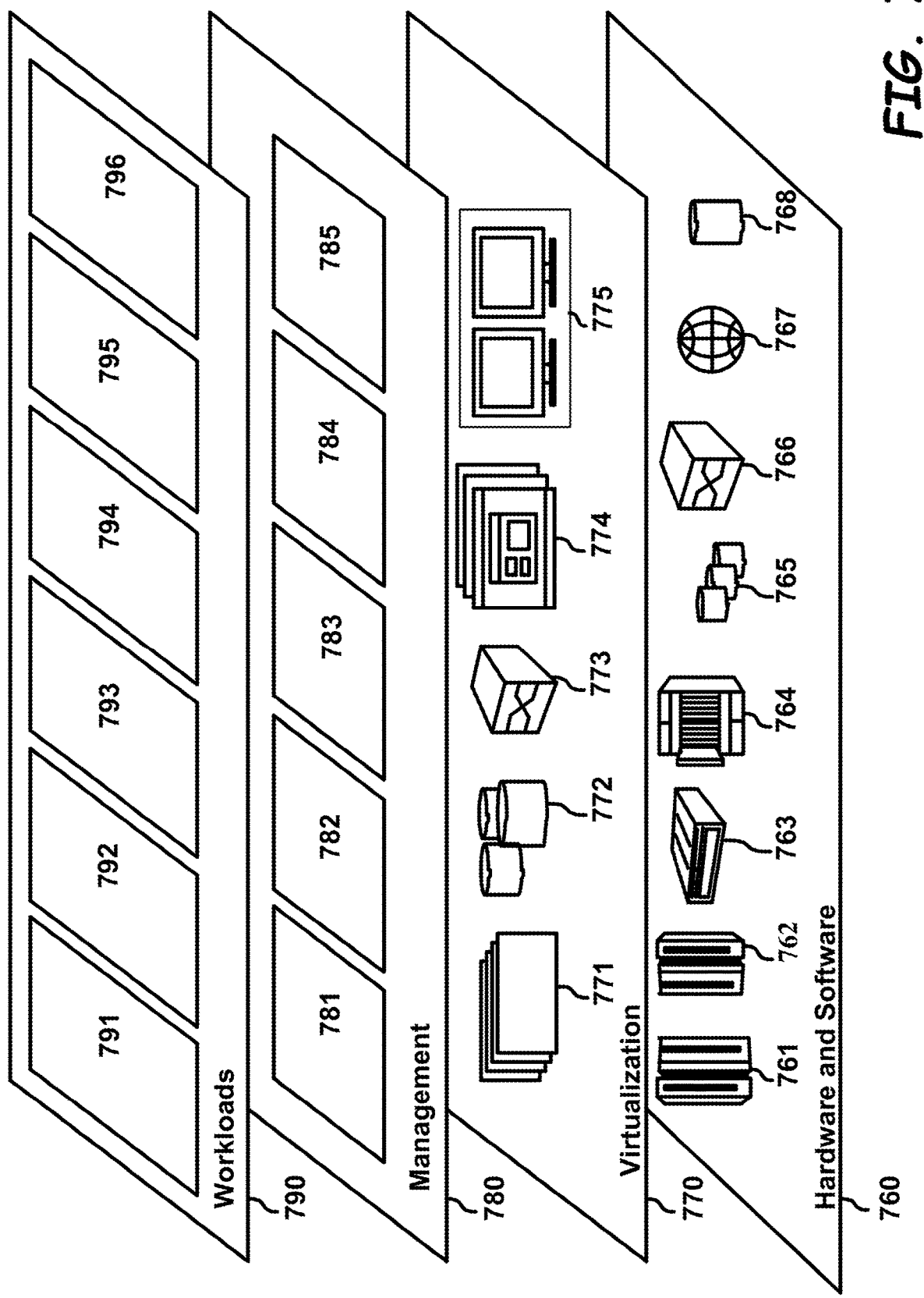

INDIVIDUAL USER CONTENT CONTROL IN MULTIUSER CONTENT DELIVERY SYSTEMS

BACKGROUND

The present disclosure relates to providing content to user in a multiuser system, and more specifically to providing each user within the multiuser system individualized parts of the overall content within a multiuser session.

Video conferencing and other multiuser communications systems have started to become more commonplace. With the increased use of these technologies people often find themselves in large virtual meetings and the like. However, in these large meetings it sometimes becomes difficult to focus on what is important to that particular user.

SUMMARY

Embodiments of the present disclosure are directed to a system for delivering content to one or more users. The system includes a content aggregator configured to gather electronic content from a plurality of users. It further includes, a preference component configured to receive from each of the plurality of users a set of preferences related to the electronic content that each user desires to receive, and a content distributor configured to distribute the aggregated content to each of the plurality of users according to the set of preferences for each user.

Embodiments of the present disclosure are directed to a computer implemented method for providing electronic content to a user in a multi user content delivery system. A set of preferences are received from a first user. This set of preferences indicates a portion of electronic content the first user desires to receive. Electronic content is received from a plurality of users. This content is then aggregated. The electronic content is then modified for the user based on the received set of preferences. The modified content is then distributed or sent to the user.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 illustrates a set of functional abstraction layers provided by cloud computing environment according to one illustrative embodiment.

Figure 1:
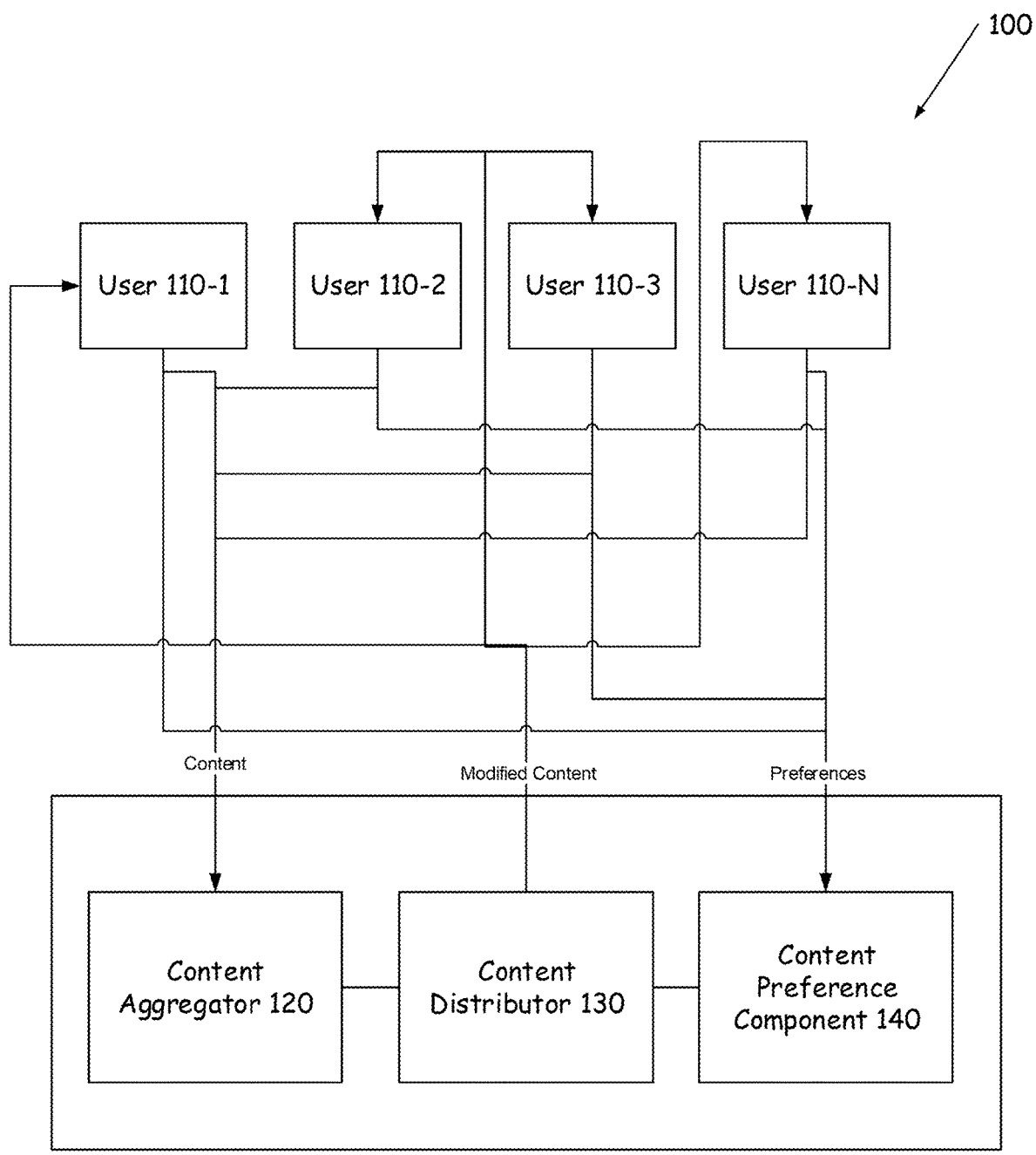
FIG. 1 is a block diagram of a content delivery system according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to providing content to user in a multiuser system, and more specifically to providing each user within the multiuser system individualized parts of the overall content within a multiuser session. While the present disclosure is not necessarily limited to such applications, various aspects of the disclosure may be appreciated through a discussion of various examples using this context.

Video conferencing, virtual meetings, and virtual meetups have rapidly become more common. In these meetings each user provides content via audio and video to the particular platform, and that platform aggregates and distributes that content back to the users. Each user gets the same content of the session. Some systems allow the host to control to some degree what content is provided to the users. For example, the host can mute a person or turn off a person's video stream. However, when this is done, it turns off that particular content from that user for everyone.

In many meetings, especially those with large numbers of attendees, it can become difficult to maintain focus on those whose content a particular user wishes to receive. During a presentation the feed may bounce back and forth with who is visible as individuals speak or otherwise interact with the system. As such, the primary individuals may move on and off the screen for periods of time. Another aspect is that a person of importance to the user may not be speaking, but the user would like to see their reactions during the meeting. As they are not speaking nor are they the host their feed can become lost among all of the other feeds. Further, as more and more people work from home and consume large amounts of bandwidth, maintaining the quality of these meetings becomes difficult as the user's own bandwidth may become limited to the point that the content cannot be delivered to them. As the user cannot control the content that they receive in the meeting the overall value of the meeting to them is diminished.

FIG. 1 is a block diagram of a content delivery system 100 according to embodiments of the present disclosure. Content delivery system 100 includes a plurality of users 110-1, 110-2, 110-3, . . . , 110-N (collectively "user 110" or "users 110"), a content aggregator 120, a content distributer 130, and a content preference component 140.

The plurality of users 110 are users who are coming together in a multiuser content delivery system 100 to share content with one another. Each user 110 connects to the content delivery system 100 via a network. Once connected with the content delivery system, the users are able to see and hear each other as well as share content with each other. For purposes of this discussion a user 110 can be an individual or it can be a computing device that contributes content intended for the group.

The content aggregator 120 is a component of the system that is configured to gather electronic content from the plurality of users 110. This content can include, for example, audio and video content that is captured from a device associated with each of the users. However, other electronic content can be used, such as, electronic documents that the user 110 wishes to share, files the user 110 has, interactions with documents on the user's 110 computer, etc. For example the content aggregator 120 can receive from a user's 110 computer a video image of the user 110 that was captured from a camera on the user's 110 computer. It can also receive audio content that was captured by a microphone on the user's 110 computer. However, in some embodiments, the electronic content received from the user 110 is received from two or more completely different devices associated with the user 110. For example, the user 110 can dial into a video conference using a telephone, while at the same time using a webcam to capture their image and using their computer to view the video conference.

The content aggregator 120 takes all of the electronic content that is received from all of the users and aggregates this information such that it can be distributed back to all of the users.

The content distributer 130 is a component of the system that takes the aggregated content from the content aggregator 120 and distributes the content the plurality of users 110. The content distributer 130 can simply take all of the aggregated content a provide all of the content to each of users who is providing content to the system. However, the content distributer 130 can provide a subset of the aggregated content to each of the users. For example, the content distributer 130 can provide to each user 110 only the content from the person who is currently speaking or presenting to the users. In some embodiments, instead of providing each user 110 with the same content the content distributer 130 can provide each user 110 with different portions of the content. The different portions of the content can include for example, providing some of the content at a high resolution, and some of the content at a lower resolution. E.g. in a video conference, providing the speakers in 4 KHD and the other attendees in HD or lower resolution. In some embodiments, the different portions can include providing one user 110 only the content from one subset of the users, and providing a different user 110 only the content from a second subset of the users. The first subset and the second subset can but do not have to include content from overlapping users. Further, the first user 110 can receive the content from the content distributer 130 at a different quality level than the second users receives the content. Additionally, the quality of the content provided to each user 110 can be provided at different levels for each user 110 that is part of the content within the particular subset that is provided to the user 110.

The content preference component 140, also referred to as the preference component 140, is a component of the system that receives from a user 110 a set of preferences regarding the content that the user 110 would like to receive. The preference component 140 allows the user 110 to determine what portion of the content the user 110 wishes to receive. The preference component 140 can also allow the user 110 to determine the quality of the content that they wish to receive. Based on the selected preferences of the user 110, the preference component 140 provides these preferences to the content distributor such that the content distributor can provide the content to the user 110 according the preferences. Each user 110 of the system can provide their own personalized preferences to the preference component 140, and have those preferences passed to the content distributor. As such, each user 110 can have or receive different content.

In some embodiments the preference component 140 can be configured to make preference choices for the user 110. These preference choices can be governed by a set of rules that either the user 110 has put into place ahead of time, or provided by the host or organizer of the event. For example, the preference component 140 can receive information from the user 110 related to the bandwidth of the connection that they are receiving from the system. The bandwidth can be detected based on the data that the user 110 is sending to the content aggregator 120. This information can indicate a quality of a connection or the like, and may be representative of the connectivity and quality of the content that the user 110 is receiving from the content distributor. Based on this information the preference component 140, using the rule, can adjust the individual preferences for the particular user 110 to enhance the user's 110 experience with the content.

Figure 2:
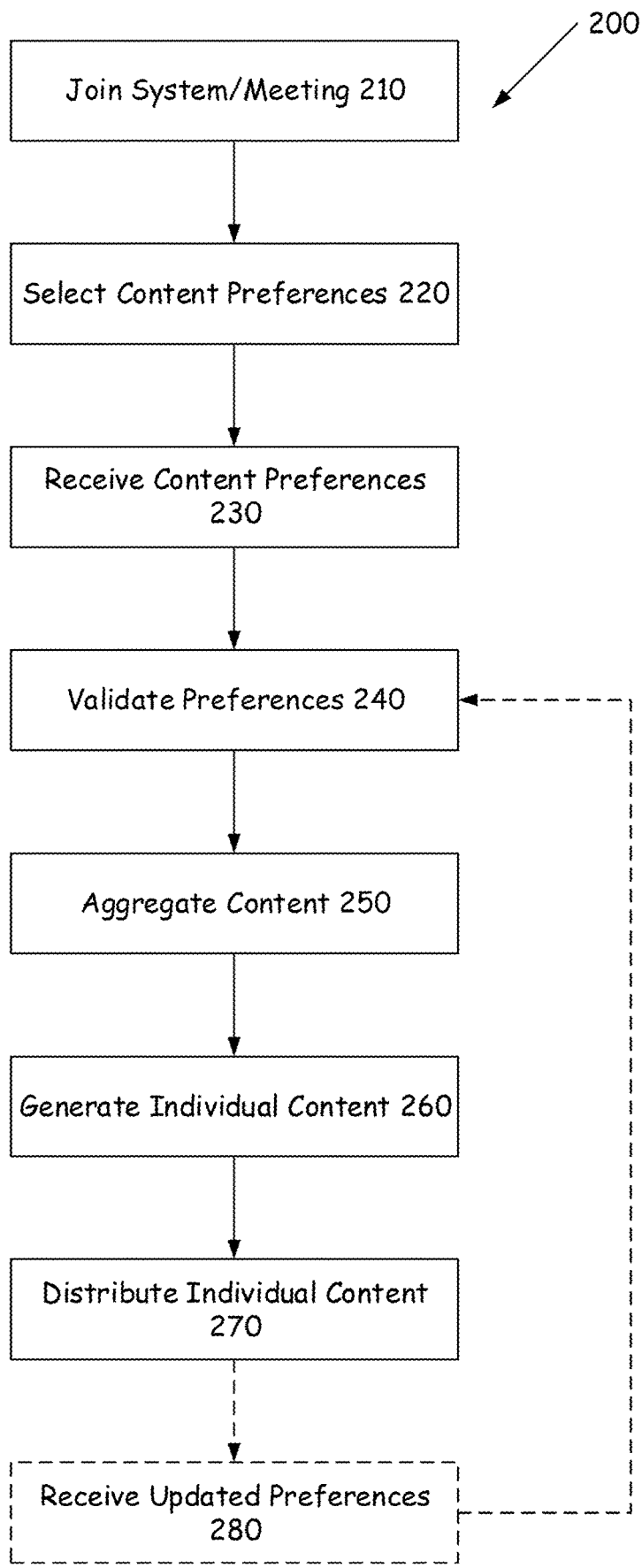
FIG. 2 is a flow diagram illustrating a process for optimizing the providing of content to users in a multi user content delivery system according to embodiments.

FIG. 2 is a flow diagram illustrating a process for optimizing the providing of content to users in a multi user content delivery system. The process provides the ability for each of the users of the content delivery system 100 to customize the content that they receive. This customization can allow a particular user 110 to see the content that they want to see while excluding the content that they don't want to see. For example, only some of the content that is provided in a video conference is of interest to the user 110. In this case the user 110 may only want to see the content that is provided by the primary presenter, and does not want to be distracted by the content that is coming from other users who are participating in the conference. Alternatively, the user 110 could be on a metered or limited connection. In this instance the user 110 may want to eliminate content so as to be able to clearly see the primary content that is provided.

The user 110 begins by joining a multi user 110 content delivery system. This is illustrated at step 210. The multi-user 110 content delivery system 100 can be any system that allows multiple users to provide content and share that content with the other users in real time. Typically, instances where this type of collaboration is found is in audio or video conferences, such as WebEx, Zoom, Google Meets, Microsoft Teams, etc. When joining these types of conferences, the user 110 may have the option to turn on/off various features of the system. For example, the user 110 can toggle their camera or microphone on or off.

Once the user 110 has joined the content delivery system, the user 110 can then select their content preferences for a particular session provided by the content delivery system. This is illustrated at step 220. The user 110 can make selections based on the information and content that they desire to receive from the content delivery system. The user 110 can make these selections through a user interface that is presented on their computer or other device that they are using to connect with the content delivery system. The user 110 can select which of the users in a particular session that the user 110 wishes to see their video, and which users they wish to hear audio from. In this way the user 110 can customize what content they want to see. In some embodiments, the user 110 can select a video quality that each of the selected users is provided to them. For example, the user 110 could choose to have their manager's video feed at the highest quality available, while other users' video quality is provided at the lowest possible level. However, the user 110 could choose to have some users' video provided at a first quality level, a different set of users' video provided at a second quality level, a third set of users' video provided at a third quality level, and so forth. The user 110 can have almost unlimited ability to customize the content that they receive. Similarly to video, the user 110 can customize the audio streams that they receive as well. In some embodiments, they can select that they only receive video from a person when that person is speaking, but not at other times.

The user's 110 indicated preferences are then received by the preference component 140 of the content delivery system. This is illustrated at step 230. The preference component 140 receives individual preferences from each of the users of the content delivery system. If a user 110 for some reason does not provide individual content preferences, the preference component 140 can associate a default or predetermined set of preferences for that particular user 110.

The preference component 140 combines the received preferences and provides the preferences to the content distributor. This is illustrated at step 240. In some embodiments, prior to sending the preferences to the content distributor, the preference component 140 validates the desired preferences of each user 110. The preference component 140 compares the desired preferences of a user 110 with a list of rules for the particular content session to ensure that they are compatible with the rules. For example, the host of the content session can indicate that certain individuals within the session cannot be blocked or otherwise ignored. In this example, the host may indicate that the host along with another individual must have their audio and video provided to all users. If a user 110 had indicated in their preferences that they only wanted the audio from the host or the other individual, the preference component 140 would determine that this preference is inconsistent with the rules, and therefore, would modify the user's 110 indicated preference to reflect the requirements of the rules. In this way the host or other administrator can ensure that certain content is delivered to the users regardless of the user's 110 individual preferences. The list of rules can be as detailed as the host or administrator desires. For example, the rules could state that video has to be provided at a minimum resolution level for certain individuals, or that certain individuals cannot be completely ignored. In some embodiments, the preference component 140 can alter the user's 110 preferences based on feedback that indicates a quality of connection for the user 110 with the content delivery system. In this embodiment, the preference component 140 can use the list of rules to ensure that the user 110 receives certain content over the content from other users.

The content distributor receives the content from the content aggregator 120. This is illustrated at step 250. The content aggregator 120 aggregates all of the content that is generated by all of the participants such that the content can be distributed out to the users.

The content distributor generates an individual content stream for each user 110 in the particular session. This is illustrated at step 260. The content distributor takes the preferences for each user 110 and customizes the feed for that user 110 based on the indicated preferences. So, for example, a first user 110 may have requested that they receive only the video feed from a specific person and the audio feeds from all of the other participants. The content distributor takes all of the content and modifies the content for this user 110 that will be delivered to them to only provide the video feed from the specific person and the audio feeds from all of the other participants. For a second user 110, that user 110 may have indicated that they want to receive video for some individuals at a high resolution level and others at a lower resolution, and another group as audio only. The content distributor takes the content and modifies the content to match the preferences of the second user 110, by leaving some of the content unchanged, by downgrading the resolution of the specific persons and removing the video for the others. The content distributor repeats this process for each of the users in the particular session applying the particular preferences of each user 110 to the content that will be delivered to them.

Once the individual content streams have been generated for each user 110, the content distributor distributes the customized content to each specific user 110. This is illustrated at step 270. Each user 110 receives their customized content via the network or other delivery means. In some embodiments, the user 110 can adjust their preferences based on a particular way a session is going. This is illustrated at step 280. For example, an individual who was initially downgraded by the user 110 turns out to be more important than the user 110 first thought. The user 110 can go to their content preferences, and adjust the preferences to indicate that the user 110 wants to receive this individual's content at a higher quality than before. This change in the user's 110 preferences is then passed to the preference component 140 and steps 230-270 are repeated to adjust the delivery of the content to the user 110 to match the new preferences.

Figure 3:
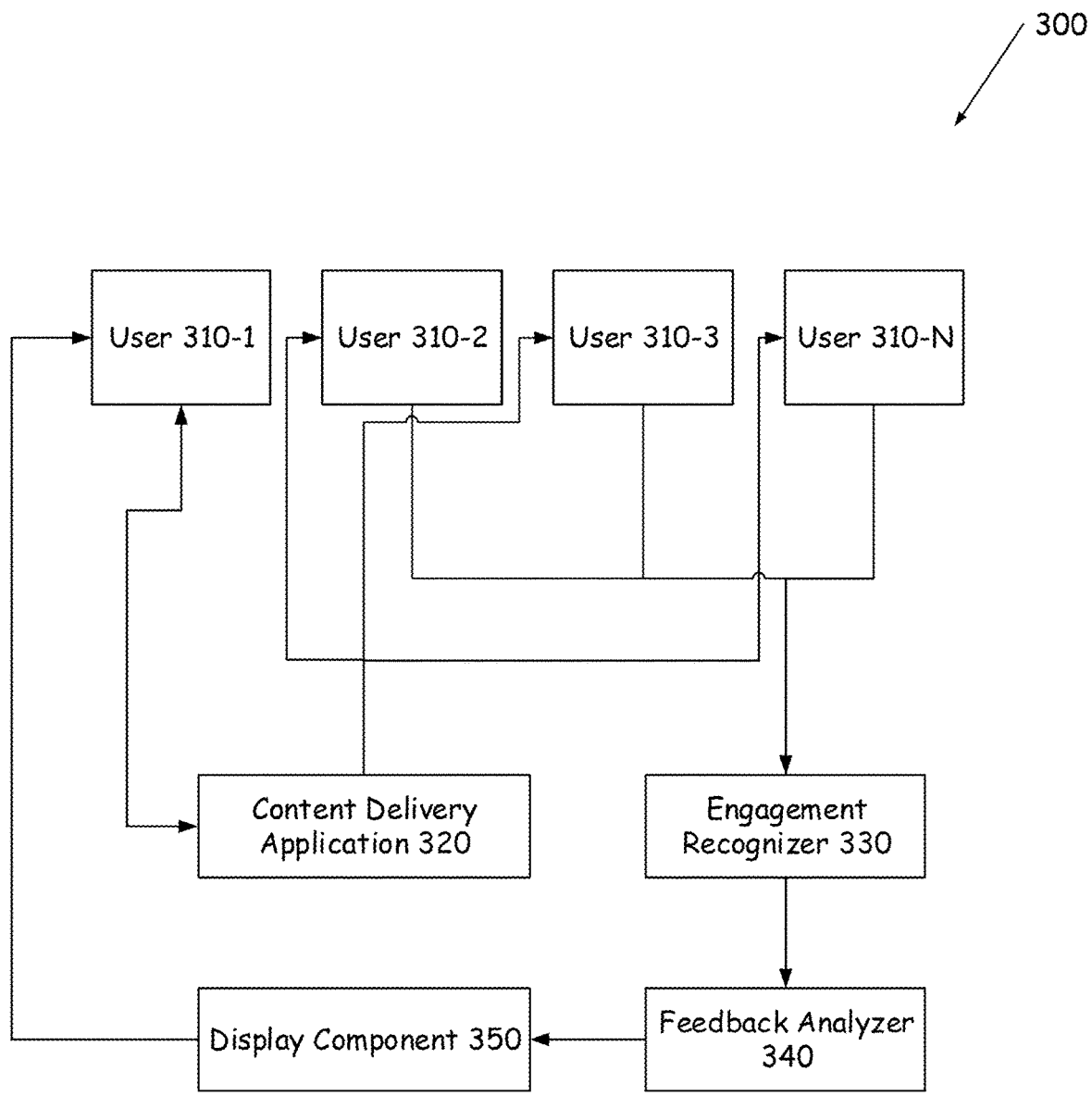
FIG. 3 is a block diagram of a system to provide feedback to a user of a multiuser content delivery system according to embodiments.

FIG. 3 is a block diagram of a system to provide feedback to a user of a multiuser content delivery system. The feedback system 300 of the present disclosure can be incorporated into the content delivery system 100 of FIG. 1 and FIG. 2, or can be a standalone system operating independently. The feedback system 300 includes a plurality of users 310-1, 310-2, 310-3, . . . 310-N (collectively users 310), a content delivery application 320, an engagement recognizer 330, a feedback analyzer 340, and a feedback display component 350.

The content delivery application 320 is a component of the feedback system 300 that delivers content to a user. In some embodiments, the content delivery application 320 takes content from all of the users of the system and aggregates it such that the content can be delivered to each of the users. However, in other embodiments the content delivery application 320 only provides content from a select number of users. This typically occurs in a large scale video or teleconference such as an educational lecture or a corporate meeting. In these circumstances there are a number of individuals who are presenters of the content and then there are a number of users who are simply consumers of the content, and do not provide content to the other users. These users only have minimal to no contact with the presenters typically by using commenting or ask a question feature of the content delivery application 320. In FIG. 3, user 310-1 is illustrated as the presenter, while the other users are audience members.

The engagement recognizer 330 is a component of the feedback system 300 that is configured to determine the relative engagement of each of the users during a presentation provided by the content delivery application 320. In some embodiments the engagement recognizer 330 is part of the content delivery application 320. However, the engagement recognizer 330 can be a standalone component that provides data related to the audience engagement to the content delivery application 320. The engagement recognizer 330 is typically installed on the computing device of each of the users such that their individual engagement can be determined. The engagement recognizer 330 can use various features of the user's computing device to determine the individual's engagement with the content provided by the content delivery application 320. For example, the engagement recognizer 330 can use the computing device's camera to determine how involved the user is or how the user is reacting to the content. The engagement recognizer 330 can process the images captured by the camera to determine a relative experience of the user. Using the images and various facial parameters the engagement recognizer 330 can determine if the user is showing indications of boredom, frowning, happiness, anger, sadness, doubtfulness, concentration, or any other number of emotions and indications of engagement. The presenter or other individual can determine which emotions or indications of engagement that they desire the engagement recognizer 330 to recognize from the users. Often times attendees will react to the content through the use of gestures, and these gestures can provide even greater clarity into the engagement of the user. As such, the engagement recognizer 330 can also use the images to determine if the user is making any type of gesturing behaviors. Gestures can include actions such as giving a thumbs up or down (indicating agreement or disagreement with something that was said), nodding of the head up and down (indicating an agreement) or moving the head side to side (indicating a disagreement), facepalming (indicating disbelief), yawning (indicating boredom), clapping, or any other type of gesture that conveys a particular emotion towards the content. The engagement recognizer 330 can be configured to identify gestures based on regional norms. This allows the engagement recognizer 330 to correctly interpret the gesture where the particular gesture has different meanings depending on where the individual is from or resides. For example, a gesture used in Asia may have a different meaning than that same gesture has when used in Europe.

In some embodiments, the engagement recognizer 330 can use a microphone on the user's computing device to identify how the user is reacting to the content. This can be used to augment the image capture approach discussed above, or can be used in instances where the user does not have an camera available to capture images. The engagement recognizer 330 can using speech recognition identify various words that the user speaks during the content to determine a user's engagement with the content. For example, the user may say something like "Are you kidding me!" The engagement recognizer 330 would recognize this as a negative reaction to the content. Likewise, the user may say "What!?" which the engagement recognizer 330 can recognize as a disbelief or shock. Other words and phrases can be uttered by the user and the engagement recognizer 330 can associate those words and phrases with various emotional states related to the content. In some embodiments, noises such as snoring can be used to also determine engagement.

In some embodiments, the engagement recognizer 330 can use other inputs to determine the user's engagement. For example, the engagement recognizer 330 can determine if the user is actively engaged with the application. This can be done by determining if the active window within the operating system is the one that is used by the content delivery application 320. If the user is actively in that window, that can be an indication that the user is engaged with the content. Likewise if the user is in an internet browser that can indicate boredom or disinterest with what is being presented. In some embodiments the engagement recognizer 330 can be configured to determine if what the user is viewing in the other window is related to the content that is being delivered by the content delivery application 320. For example, the engagement recognizer 330 can determine that the user is using the internet browser to look up something that was said or presented by a presenter. In this case, the use of the browser indicates engagement with the content as the user is actively engaging with the content. However, if the user is browsing a news site or an online commerce site, this could be interpreted as disinterest.

The engagement recognizer 330 process the user's relative engagement to generate an indication that can be sent to the feedback analyzer 340. The user's relative engagement can be converted to a very small digital indication of the engagement. For example, the engagement can be represented by a single byte of data. In this instance the value of the byte represents a particular indication of engagement. This allows the relative engagement to be transmitted to the feedback analyzer 340 using a very minimal amount of the available bandwidth. However, in other embodiments the relative engagement can be represented by a larger or smaller amounts of data. (e.g. a number of bits less than a byte, or a multibyte data that includes more information about the engagement).

The feedback analyzer 340 is a component of the feedback system 300 that receives the relative engagement data from each engagement recognizer 330 associated with the each of the users, and aggregates this data to create feedback scores for the audience. The feedback analyzer 340 interprets the relative engagement data for each user and assigns that data to a particular feedback indication. As discussed earlier these indications can correlate with the various emotions associated with engagement. For example, if seven of the users indicate positive engagement and 3 of the users indicate negative engagement, the feedback analyzer 340 would determine that 40% of the users are positively engaged and 30% of the users are negatively engaged. This aggregated response is then transmitted to the presenter of the content such that they can receive the audience feedback. The feedback analyzer 340 can provide this aggregated information periodically such as every minute or every 5 minutes. However, in some embodiments the feedback analyzer 340 can provide this information continuously during the presentation. In this embodiment, the engagement recognizer 330 also provides the engagement data continuously as well. In this way the presenter is kept up to the minute aware of the way the audience is reacting to the content, much in the same way they would be able to read the audience were the content being delivered live to a room full of people. Depending on the configuration of the feedback system 300, the feedback analyzer 340 can aggregate any number of different engagement indications that are identified by the engagement recognizer 330. Further, the feedback analyzer 340 can filter or separate the engagement indications based on categories of users. For example, the audience can include the presenter's team, their manager, senior management, outside individuals, etc. The feedback analyzer 340 can aggregate the engagement indications for each of these categories of users such that when presented to the presenter, they are able to see the relative engagement of the individuals who fall into each of these categories.

The feedback display component 350 is a component of the feedback system 300 that is configured to display the various feedback indications that are determined by the feedback analyzer 340. The display component 350 receives from the feedback analyzer 340 the engagement indications. The display component 350 converts the engagement indications to a visual representation that can be quickly and readily understood by the presenter. For example, the display component 350 can provide the presenter with a color coded dot that indicates the engagement of the audience as a whole. In this approach the dot may appear green when the audience is, as a whole, showing positive engagement with the content. The dot can move to a yellow color when, as a whole, the audience is showing a neutral engagement with the content, or a portion of the audience is showing positive engagement and a portion of the audience is showing negative engagement. Likewise, the dot can appear red when a significant portion of the audience is showing negative engagement. In some embodiments the display component 350 can provide more detailed feedback to the presenter. For example, the display component 350 can display the engagement indications for multiple different levels of engagement. Using the dot example, the display component 350 can show, for example, three dots at one time (e.g. green, yellow, red). Each of the dots can be displayed at an intensity level that allows the presenter to see which levels of engagement more of the audience is in. This can be achieved by increasing the intensity of the dot in response to more of the audience falling into the particular category.

In some embodiments, as opposed to dots, the display component 350 can provide the engagement indications to the presenter as emoji or emoticons. The emojis are pictorial representations of human emotions or engagement. The emojis can show emotions such as pleasure, happiness, boredom, disinterest, agreement, disagreement, etc. These emojis can be static in that they do not include animation or can be dynamic where they show animation to provide a better understanding of how the audience is reacting. However, it should be noted that the display component 350 can provide the engagement indications in any manner that provides the presenter with useful information regarding the relative engagement of the audience.

In some embodiments the display component 350 is not provided to the presenter, but is instead provided to another individual who is monitoring the presentation. In this embodiment, the person receiving the engagement indicators can provide the feedback to the presenter in a controlled manner. For example, the monitor can let the presenter know how the audience is reacting periodically, and the presenter is not distracted by a constant display of the engagement indications. In some embodiments, the display component 350 can be used to assess the performance of a presenter such that the presenter can be graded or given tips to improve their presentation to maintain stronger audience engagement. In some embodiments, both the presenter and the monitor both receive the engagement indications.

Figure 4:
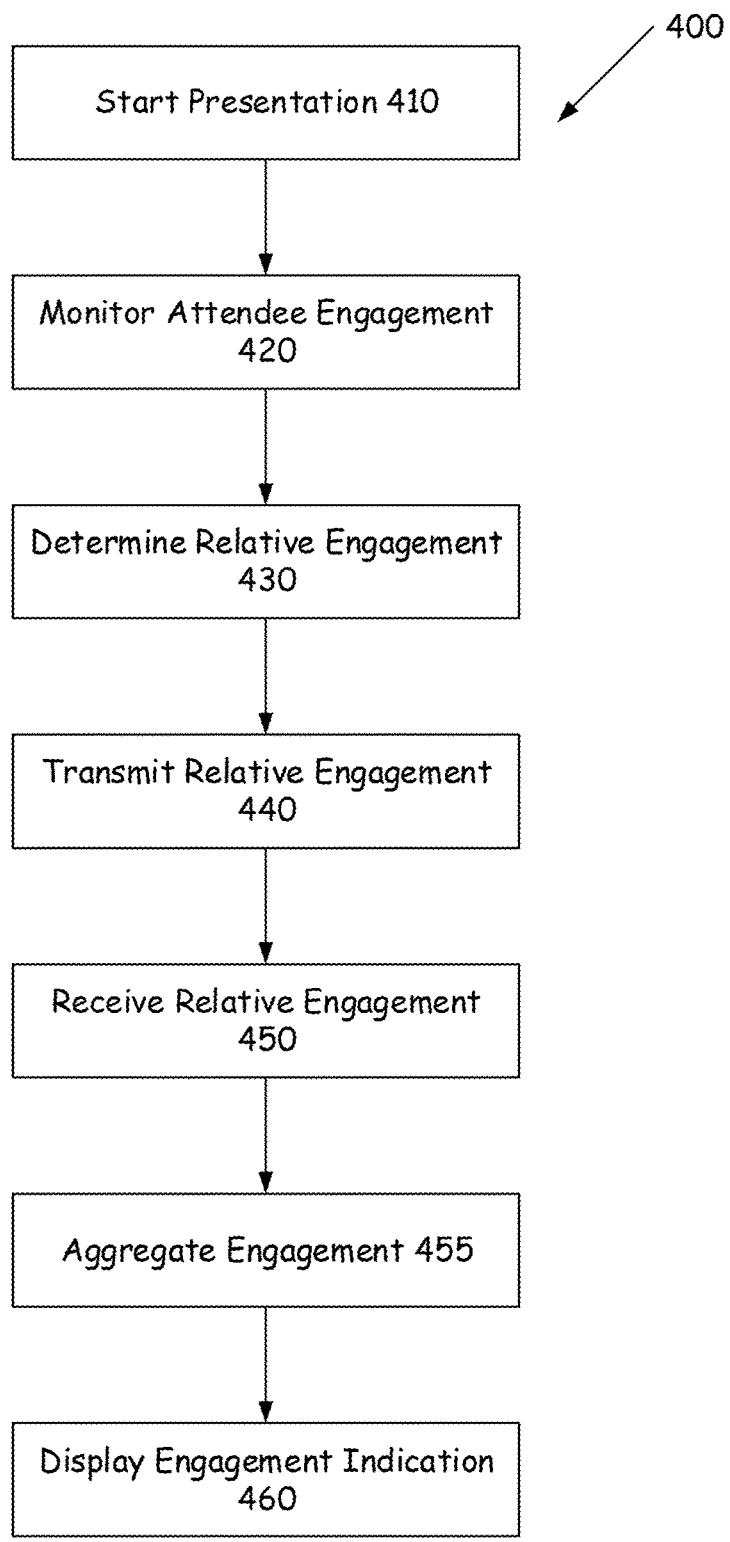
FIG. 4 is a flow diagram illustrating a process for providing audience engagement feedback to a presenter according to embodiments.

FIG. 4 is a flow diagram illustrating a process for providing audience engagement feedback to a presenter. The process begins when the presenter starts their presentation. This is illustrated at step 410. The presenter can open a content delivery system, such as system 100 above, in preparation for delivering their content to an audience. In some embodiments the content delivery system is a video conferencing systems, such as WebEx, Zoom, Microsoft Teams, Google Meets, etc. In some embodiments the presenter is presenting to the audience in a manner that prohibits them from seeing or reacting to the audience. Typically this occurs when the audience is quite large and the system provides for both a presenter room and an audience room. This commonly occurs in situations such as continuing legal education classes, university classes, large scale corporate meetings and the like.

Once the presenter begins their presentation, the feedback system 300 begins to monitor the engagement of the attendees. This is illustrated at step 420. To monitor the engagement of the attendees the feedback system 300 accesses various input components that are present on each attendee's computing devices. This can include components such as a video camera and/or a microphone attached to the computing device. Through these components the engagement recognizer 330 of the feedback system 300 is able to determine a relative level of engagement of the attendee.

Throughout the presentation the engagement recognizer 330 of the feedback system 300 determines the relative engagement of a corresponding attendee. This is illustrated at step 430. To determine the relative engagement of the attendee the engagement recognizer 330 can use various approaches based on the information that is being monitored. For example, the engagement recognizer 330 can process the images captured by the camera to determine a relative experience of the user. Using the images and various facial parameters the engagement recognizer 330 can determine if the user is showing indications of boredom, frowning, happiness, anger, sadness, doubtfulness, concentration, or any other number of emotions and indications of engagement Attendees sometimes react through the use of gestures, and these gestures can provide even greater clarity into the engagement of the user. As such, the engagement recognizer 330 can also use the images to determine if the user is making any type of gesturing behaviors.

In another example, the engagement recognizer 330 can use a microphone on the user's computing device to identify how the user is reacting to the content. This can be used to augment the image capture approach discussed above, or can be used in instances where the user does not have an camera available to capture images. The engagement recognizer 330 can using speech recognition identify various words that the user speaks during the content to determine a user's engagement with the content In some embodiments, noises other than spoken words, such as snoring or yawning, can be used to determine engagement.

In some embodiments, the engagement recognizer 330 can use other inputs to determine the user's engagement. For example, the engagement recognizer 330 can determine if the user is actively engaged with the content delivery application 320. For example, if the user is actively in that window, that can be an indication that the user is engaged with the content. In contrast, if the user is in an internet browser that can indicate boredom or disinterest with what is being presented.

The relative engagement of each attendee is then converted to an indication that can be sent to the feedback analyzer 340. This is illustrated at step 440. The relative engagement can be converted to a very small digital indication of the engagement. For example, the engagement can be represented by a single byte of data. In this instance the value of the byte represents a particular indication of engagement. This allows the relative engagement to be transmitted to the feedback analyzer 340 using a very minimal amount of the available bandwidth. However, in other embodiments the relative engagement can be represented by a larger or smaller amounts of data depending on the desired granularity that is desired.

The feedback analyzer 340 receives the indication of the relative engagement from each of the attendees. This is illustrated at step 450. This data is aggregated to create feedback scores for the audience as a whole. This is illustrated at step 455. The relative engagement data for each user is interpreted and assigned to a particular feedback indication. This aggregated information can be provided periodically such as every minute or every 5 minutes. However, in some embodiments this information is provided continuously during the presentation. Depending on the configuration of the feedback system 300, any number of different engagement indications that are identified by the engagement recognizer 330 can be aggregated. Further, the engagement indications can be filtered or separated based on categories of users. For example, the audience can include the presenter's team, their manager, senior management, outside individuals, etc. The engagement indications for each of these categories of users can be aggregated such that when presented to the presenter, the presenter is able to see the relative engagement of the individuals who fall into each of these categories.

The aggregated response is then transmitted to a display component 350 that will display to the presenter of the content the audience feedback. This is illustrated at step 460. The aggregated response is converted to a visual representation that allows the presenter to easily and quickly see the audience engagement. The representation can be made using, for example, colored dots that show how the audience is engaging in the content. This representation can be made for the audience as a whole with one dot representing the overall engagement of the audience, or can be made using multiple dots of different colors and modifying the intensity of each dot based on the audience engagement. In some embodiments, the display can separate audience members by position or other differentiator. For example, in a work conference, the audience can be divided into groups representing peers, reports, and managers where each of these groups is represented by a different set of indications in the display. It should be noted that many different forms of displaying the audience feedback can be used instead of dots, such as, emojis or emoticons. However, any format that provides feedback information to the presenter in a visual manner can be used.

Figure 5:
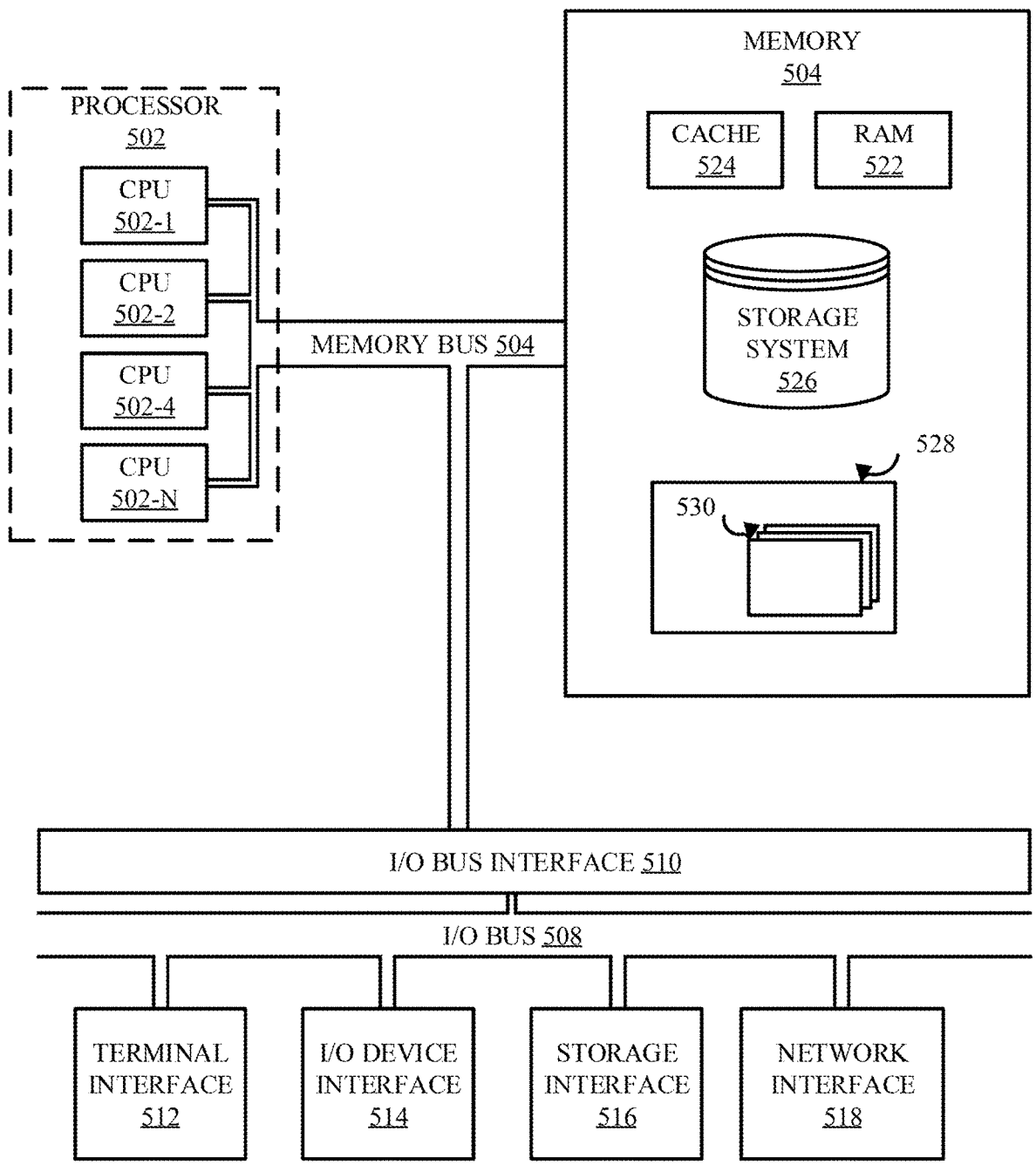
FIG. 5 is a block diagram illustrating a computing system according to one embodiment.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure discussed in the FIGs above. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
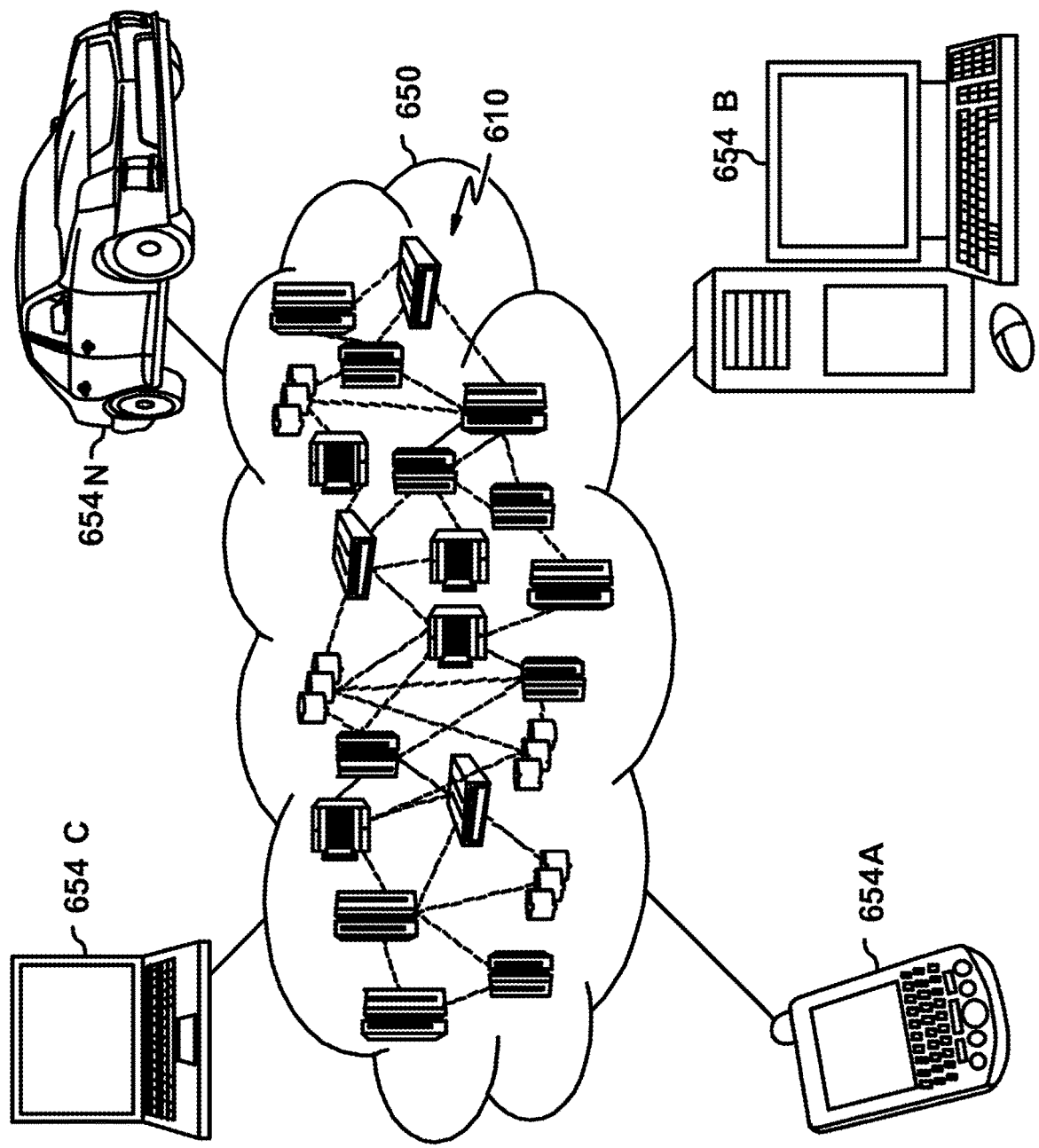
FIG. 6 is a diagrammatic representation of an illustrative cloud computing environment.

The system 100 may be employed in a cloud computing environment. FIG. 6, is a diagrammatic representation of an illustrative cloud computing environment 650 according to one embodiment. As shown, cloud computing environment 650 comprises one or more cloud computing nodes 654 with which local computing devices used by cloud consumers, such as, for example, personal digital assistant (PDA) or cellular telephone 654A, desktop computer 654B, laptop computer 654C, and/or automobile computer system 654N may communicate. Nodes 654 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 654 and cloud computing environment 650 may communicate with any type of computerized device over any type of network and/or network addressable connection (e.g., using a web browser).

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; content delivery and processing 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A content delivery system comprising:
a content aggregator configured to gather electronic content from a plurality of users, wherein the electronic content is generated in real-time from each of the plurality of users;
a preference component configured to receive from each of the plurality of users a set of preferences related to the real-time electronic content that each user desires to receive; and
a content distributor configured to distribute the aggregated content to each of the plurality of users according to the set of preferences received for each user for the real-time electronic content.

2. The content delivery system of claim 1 wherein the set of preferences are provided on a per user basis.

3. The content delivery system of claim 1 wherein the set of preferences indicates a subset of the plurality of users that an individual user desires to receive content from, and a second subset of users that the individual user does not desire to receive content from.

4. The content delivery system of claim 1 wherein the set of preferences indicates a quality of the content an individual desires to receive.

5. The content delivery system of claim 1 wherein the preference component is further configured to compare the set of preferences against a set of rules, and modify the set of preferences to conform to the set of rules when the set of preferences are not consistent with the set of rules.

6. The content delivery system of claim 1 wherein the content distributor is further configured to modify the aggregated content to conform with the set of preferences.

7. The content delivery system of claim 1 wherein the content distributor provides a first version of the content to a first user and a second version of the content to a second user.

8. The content delivery system of claim 1 wherein the content distributor provides a first user only a portion of a second user's content.

9. The content delivery system of claim 8 wherein the content distributor provides the first user a second portion of a third user's content.

10. The content delivery system of claim 9 wherein the portion is audio content from an audio and visual content provided by the second user, and the second portion is audio and visual content from the third user, wherein the visual content of the third user is provided by the content distributor to the first user at a lower quality than the visual content was received from the third user.

11. The content delivery system of claim 1 wherein the electronic content is audio and video content.

12. A method for providing electronic content to a user in a multi user content delivery system, comprising:
receiving a set of preferences from a first user, the set of preferences indicating a portion of currently provided electronic content the first user desires to receive;
receiving electronic content from a plurality of users, wherein the electronic content is generated in real-time;
aggregating the electronic content from the plurality of users;
modifying the electronic content from the plurality of users based on the received set of preferences; and
distributing the modified electronic content to the first user in real time according to the received set of preferences for the currently provided electronic content.

13. The method of claim 12 further comprising:
receiving a second set of preferences from a second user, the second set of preferences indicating a second portion of electronic content the second user desires to receive;
modifying the electronic content from the plurality of users based on the received second set of preferences; and
distributing the second modified electronic content to the second user.

14. The method of claim 12 further comprising:
validating the received set of preferences against a list of rules defining a minimum set of preferences for the electronic content; and
modifying the received set of preferences to conform with the list of rules in response to the received set of preferences not meeting the minimum set of preferences.

15. The method of claim 12 wherein modifying the electronic content removes a portion of the electronic content.

16. The method of claim 12 wherein modifying the electronic content reduces a quality of at least a portion of electronic content.

17. The method of claim 12 wherein the electronic content is both audio and video content; and
wherein modifying the electronic content removes the video content associated with a subset of the plurality of users.

18. The method of claim 12 further comprising:
receiving from each of the plurality of users an associated set of preferences for each of the plurality of users;
modifying the electronic content from the plurality of users for each of the plurality of users based on the received associated set of preferences for each of the plurality of users; and distributing the modified electronic content to each of the plurality of users, wherein each of the plurality of users receives the electronic content based on the associated set of preferences for each user; and wherein at least a subset of the plurality of users receives a different version of the electronic content than a second subset of the plurality of users.

19. The method of claim 18 wherein each user in the subset of the plurality of users receives different versions of the electronic content.

20. A computer program product embodied on a computer readable storage medium having computer executable instructions for providing electronic content to a user in a multi user content delivery system that when executed cause one or more computer processors to execute instructions to:

receive a set of preferences from a first user of a plurality of users, the set of preferences indicating a portion of currently provided electronic content the first user desires to receive;

receive electronic content from the plurality of users, wherein the electronic content is generated by the plurality of users in real time;

aggregate the electronic content from the plurality of users;

modify the electronic content from the plurality of users based on the received set of preferences; and distribute the modified electronic content to the first user according to the received set of preferences for the currently provided electronic content.

\* \* \* \* \*